L. C. SNELL.
OIL DISTRIBUTION SYSTEM.
APPLICATION FILED JUNE 24, 1909.
1,088,667.
Patented Feb. 24, 1914.
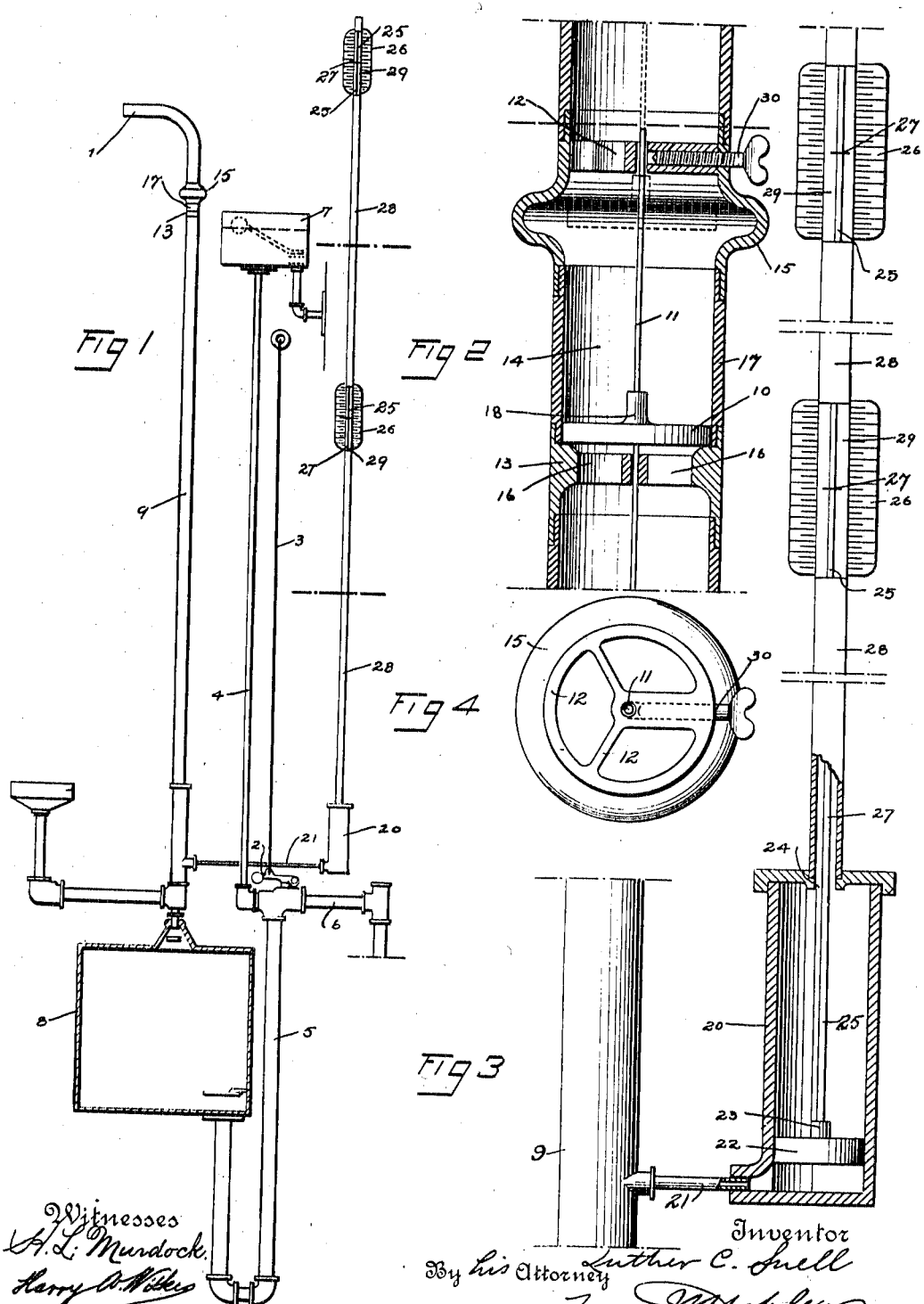

UNITED STATES PATENT OFFICE.

LUTHER C. SNELL, OF ALGONAC, MICHIGAN.

OIL-DISTRIBUTION SYSTEM.

1,088,667.  Specification of Letters Patent.  Patented Feb. 24, 1914.

Application filed June 24, 1909. Serial No. 504,016.

*To all whom it may concern:*

Be it known that I, LUTHER C. SNELL, a citizen of the United States, and resident of Algonac, in the county of St. Clair and State of Michigan, have invented certain new and useful Oil-Distribution Systems, of which the following is a specification.

This invention relates to improvements in oil distributing systems.

Heretofore oil distributing systems have been used wherein the oil is stored in a receiving tank and delivered therefrom by means of hydrostatic pressures produced by increasing the water level or head in a water pipe adapted to deliver water under the oil.

It is the object of the present invention to overcome certain objections which have existed and are herein set forth as follows:—Where the delivery of oil from the system has been at a height above the normal oil level, it has been necessary to fill the delivery pipe from the storage tank to the outlet on each operation, thus occasioning a loss of time. After discontinuing the flow of oil, the water has rushed backward and attained a momentum which has carried the water in the water column pipe into the waste pipe when not intended. When the water has then settled back it falls below the waste pipe and establishes a false head. A further disadvantage has existed in that the gage for determining the quantity of oil in the system under normal conditions if the tank is in a cellar or pit has been placed in the cellar, or the pit, inconvenient for the inspector, and, therefore, usually neglected.

A further object of this invention is to provide means whereby the oil may be drawn into the storage tank of the system by suction from the delivery van or other source of supply.

In the drawings: Figure 1 is a side elevation, in diagrammatic arrangement, of an oil distribution system constructed in accordance with this invention. Fig. 2 is an enlarged detail view in vertical section of the valve portion of the delivery pipe, constructed in accordance with this invention. Fig. 3 is an enlarged detail view in vertical section of the delivery pipe and gage mechanism. Fig. 4 is an enlarged view of one of the guides for guiding the movement of the suspension valve shown in Fig. 3.

—8— designates the storage tank; —9— the delivery pipe having a discharge nozzle —1—; —7— a water supply tank, and —4— a discharge pipe which is connected to a conduit —5—, the latter being in turn connected to the tank —8— at the bottom thereof through the medium of a pipe —5—. The connection between the members —4— and —5— is controlled by a valve b, and this valve is constructed to cut off communication between the pipe —5— and the sewer connection —6— when the conduit —4— is open and to establish communication between the parts —5— and —6— when the conduit —4— is closed.

Arranged at one side of the pipe —9— is a cylinder —20— which is connected thereto by means of a restricted pipe —21—. Traveling within the cylinder is a piston or float —22— which carries a rod —25—. Upon the upper face of the float is a valve —23— that is adapted to close the opening —24— that leads to a conduit —28— within which the member —25— is arranged for vertical travel. The member —28— carries spaced gage plates —26—, and the rod —25— is provided with spots or marks —27— which serve as pointers or index hands for the gage plates.

In the operation of the system shown in Fig. 1, the operator, after having connected the nozzle —1— to the tank to be filled, raises the arm —2— by means of the rod —3—. The arm —2— is connected with a valve which operates to open the passageway between the pipes —4— and —5—, and to close the passageway between pipes —5— and —6—. The water head is now increased to the level of the water in the tank —7— and the corresponding level of the oil in the storage tank —8— is raised in the delivery pipe —9—, to deliver the same through the nozzle —1—.

When the delivery has been completed, the operator by releasing the rod —3— closes the valve between the pipes —4— and —5—, and opens the valve between pipes —5— and —6—. This establishes the water head at the level of the pipe —6—, and immediately tends to return the oil from the delivery pipe —9— back into the tank —8—. Where the pipe —9— is of considerable length, it will be recognized that the action of filling the said pipe to the delivery end of the same consumes considerable time. It will also be observed that under the same conditions when the pipe —5— is open to the pipe —6—, which is a waste pipe, the column of oil and water in the tank —8— and pipe —9— overbalances the water in the pipe —5— to a large degree, which, if unchecked, would force the water in the pipe —5— into the pipe —6— very rapidly and establish a momentum in the column of oil in the pipe —9—, which in falling would cause too much of the water in pipe —5— to overflow into pipe —6—. On settling, this diminished amount of water would produce a level of the oil below that desirable for indicating the remaining supply. This action is partially avoided by the use of the valve —10—.

The valve comprises a disk —10— provided with a guide stem —11—, which extends to a distance on either side of the valve disk. This stem is guided in perforations provided in the center of spider casting —12— and —13—. The spider casting —12— is formed in the section constituting the upper end of the valve chamber —14—. This section is enlarged to form the laterally extended chamber —15—. On the lower spider is formed a valve seat —16—. Both the lower and upper ends of the section 17 are fitted to the various sections of the delivery pipe —9— and the short section —17— which forms the valve chamber —14—. This section of pipe —17— may be varied in length to increase or diminish the length of the chamber —14—. The valve disk —10— is formed to a diameter to closely fit the interior of the chamber —14—. The valve disk is provided on the upper surface with a hub-like extension —18—, of such a length that the upper end of the said hub will strike the spider —12— when the valve is raised to its highest position. This position is that shown in Fig. 2 in dotted lines, where the valve is mid-distance in the extended portion of the upper section indicated by the numeral —15—. In its operation this valve disk —10— is lifted by the rising column of oil until the hub —18— strikes against the spider —12—, when the valve disk —10— is opposite the extension —15—, and the oil is permitted to pass around the edge of the valve to the delivery end of the pipe —9—. The valve is maintained in this position while the oil is rising in the pipe —9—. This continues as long as the operator maintains the lever —2— in its raised position. When the operator permits the lever —2— to fall, thereby cutting off the pipe —4—, the column of oil in pipe —9— ceases to rise and immediately starts to fall because the supporting column of water in the pipe —5—, is over balanced by the water and oil in the tank —8— and pipe —9—. At this instant of recession of the oil in pipe —9—, the oil fills the said pipe to the top of the same. With the cessation of the upward flow of the oil in the pipe —9—, the valve disk sinks. In this action it is aided by the downward movement of the oil in the pipe —9—. When the valve disk passes into the chamber —14— and out of line with the extension —15—, it closes the chamber —14— and descends until it rests on the seat —16— formed on the spider —13—. Here the valve rests, and a part of the oil that was in the upper end of the delivery pipe —9— extending to the outlet thereof, is retained in the pipe —9— and chamber —14— upon the valve —10—, thereby closing the pipe hermetically.

The oil in the pipe —9— is maintained therein at a certain height by the hydrostatic column, but by employment of the valve —10— the oil is maintained in the pipe —9— by the coöperation of the atmospheric pressure to within close proximity of said valve, since any separation of any oil under the disk from the disk will produce a vacuum at that point.

The succeeding operation, it will be noticed does not now wait for the filling of the delivery pipe —9—, it being already filled.

The operation of all deliveries of oil when using this construction is that described, and it will be observed that in each instance when the delivery of the oil is discontinued, the delivery pipe —9— remains filled nearly up to the valve —10—, which in most instances is within a few inches of the outlet of the pipe. In this manner is the objection to the delay in the filling of the delivery pipe; and the subsequent backward rush of the oil contained therein; overcome.

By the terms "normal high oil level" and "normal low oil level," as hereinafter used, is meant; "normal high oil level" is the top of the oil column when the system is fully supplied with oil; normal low oil level is the top of the oil column when the oil is exhausted to that point at which it has been decided to stop delivery until more oil has been supplied to the tank. The system is never completely exhausted of oil. By "normal" in this connection is meant the condition when oil is not being delivered or received. These terms refer to a system in which is not used the check valve herein shown and described. The cylinder —20— is connected to the pipe —9— by means of a contracted connecting pipe —21—. The pipe —21— is of a diameter small enough to cause the cylinder —20— to fill slowly. Within the cylinder —20— is placed a float —22—, constructed of any suitable material. Extended from the top of the float —22— is a boss —23—, arranged to form a valve to close the upper opening from the cylinder —20— when the float —22— is raised to its highest position. At the top of the cylinder —20— is a perforation —24—, extending through a valve seat provided to receive the boss —23—. Through the perforation —24— is extended a small rod —25—, made of the lightest material available, which is extended upward vertically to the marked gage plates —26— —26—. Opposite the gage plates —26— —26—, the rod —25— is provided with spots —27— —27—. The rod is carried in the center of small pipes —28— —28—. These are constructed of suitable metal and are joined with the glass tubes —29— —29— that are provided opposite the gage plates —26— —26—, so that the spots —27— on the rod —25— may be viewed with relation to the gage plates —26— —26—. The upper end of the pipe —28— is open to the atmosphere, so that atmospheric pressure is maintained in the cylinder —20—. The float —22— carries its own weight and that of the rod —25—. The rod —25— is so mounted as to avoid friction in the pipe —28—.

The oil level in the cylinder —20— is maintained between the normal high and normal low levels of the oil contained in the system, and is calculated independently of the oil suspended in the pipe —9—, and thus the level of the float —22— and the indicated position of the spots —27— on the gage plates —26— indicates accurately the quantity of oil contained in the system.

By means of the column of water in pipe 5, the column of gasolene in the tank 8 plus that in the pipe 9, is maintained at its proportionate level. That is to say, a column of water 12 inches high will balance a column of gasolene 17 inches high when the two columns are joined at the lower end as is a U shaped conduit. The proportionate variance of the column of gasolene and added water in the storage tank and delivery pipe, supported by the column of water in the pipe 5, is increased or diminished in relation to the level of water in pipe 5 as the proportion of water is increased or diminished in said tank. This difference in height is shown by the rod 25 on the gage 26.

The gage is so marked that the difference in height referred to indicates the variation of the quantity of oil contained in the system calculated independently of oil contained in the pipe 9 above the level of the float.

The oil in the pipe —9— is held in suspension when the valve 10 is closed (the two bodies of oil are in automatic balance when the valve 10 is closed) and does not affect the oil level in the cylinder —20—, the level whereof is due to the upward lift of the column of water in the pipe —5—. Oil is forced into the cylinder —20— to fill the same during delivery of oil from the system when the water "head" is the tank —7—. The oil would rise in the pipe —28—, but is prevented by the boss —23— closing the entrance into the pipe —28—. When the water "head" is changed to the level of the pipe —6— the oil in cylinder —20— sinks to the normal oil head.

While I have described the cylinder —20— as containing the float —22— and the parts connected thereto which constitute the gages, there is another purpose which the cylinder —20— subserves. When, as is apt to occur, the column of oil contained in the pipe —9— is permitted to drop rapidly into the tank —8—, the water is raised in the pipe —5— to overflow into the waste pipe —6— more than is intended. When now the water settles back into the pipe —5—, the oil in the system is not raised to the usual height. When the oil is raised in the pipe —9— above the cylinder —20—, the cylinder —20— is filled through the pipe —21— and remains filled while the pressure is exerted on the pipe —9—.

When the action above described of the falling column occurs, by reason of the small diameter of the pipe —21— the oil is slowly drawn from the cylinder —20— and continues to flow after the columns of water and oil have settled to what has been described as a too low head. The oil from cylinder —20— now reëstablishes the proper height by raising the oil on the tank side and thereby raising the water in the pipe —5—. Each time the oil is raised in the pipe —9— or whenever the system is used for filling by suction, this action of the cylinder —20— occurs.

I have described the action of the system as it applies to the delivery of oil. It sometimes is convenient to fill the system by drawing the oil out of the supply tank or barrels by means of suction established within the system. To do this I connect the nozzle —1— on the delivery pipe to a flexible hose which I introduce into the oil in the supply tank. Having established this connection, I raise the oil in the delivery pipe to carry over any air above the valve —10— into the supply tank. While the valve —10— is raised, I set forward the set screw —30— against the stem —11— and lock the valve in the position where it is opposite the extension —15—. By now releasing the rod —3—, the overbalance of the column in the pipe —9— is such as to overcome the water column in the pipe —5—. Consequently the flow starts from the top of the pipe —9— backward into the tank —8—. A siphon is thus established, from the barrel or tank car, which continues until the oil is emptied into the tank —8—. It will be observed that the pressure in the pipe —9— has filled the cylinder —20— until the float —22— is at the top of the same. When the final oil is delivered into the tank, it will be found that the momentum established in the column of oil falling and the column of water in the pipe —5— rising, has discharge from the pipe —5— more than needed. When the last of the oil is drawn into the system, the column —5— settles back to the point where it balances the column of oil in the tank and delivery pipe. It will then be found that the head of the column —5— is slightly below the pipe —6—. The action of the cylinder —20— just above described now occurs whereby the oil in said cylinder is delivered slowly into the system raising the column of oil and thereby lifting the column of water until the same reaches the overflow pipe —6— or overflows the same slowly until the oil column balances the water column.

It will be understood that the purpose of establishing a fixed height of water column by the means just described is to make the reading of the gage correct. As this gage operates by the differential gravity of the water and oil it is evident that to give a reading which always corresponds to the exact height of oil in the tank, a water column of fixed height is absolutely essential. Such a fixed height of column cannot be obtained by merely permitting the oil and water columns to find their equilibrium for the reason that the inertia of the descending oil column will carry it below the balancing level and will displace too much water so that the column will be shortened and would thus give a false reading on the gage. Such an effect is however, avoided with my improvement as the oil in the cylinder 20 passing slowly through the restricted passage reestablishes the full height of water column after the fluctuations due to inertia have ceased.

Having thus described this invention, what is claimed is:—

1. An oil distributing system comprising; a tank for storing oil: a delivery pipe extended above the said tank; a water column the pressure of which is adapted to be varied at will to raise the oil from said tank to the delivery end of said delivery pipe; a float gage to show the quantity of oil in the system at a location removed from the said tank; means for maintaining a column of oil in said delivery pipe above the said float of the gage in open communication therewith.

2. An oil distributing system comprising; a tank for storing oil: a delivery pipe extended above the said tank; a water column the pressure of which is adapted to be varied at will to raise the oil from said tank to the delivery end of said delivery pipe; a float gage to show the quantity of oil in the system having a cylinder connected in open communication with the said tank and extending between the normal high and low oil levels of the system, and a device in said cylinder to operate to indicate the level of the oil in the system exclusive of the oil above said device; and means for maintaining a column of oil in said delivery pipe above the said float of the gage.

3. An oil distributing system comprising; a tank for storing oil: a delivery pipe extended above the said tank; a water column the pressure of which is adapted to be varied at will to raise the oil from said tank to the delivery end of said delivery pipe; a float gage to show the quantity of oil in the system having a cylinder in open communication with the said tank and extending between the normal high and low oil levels of the system, and a float in said cylinder to be supported by the oil therein, said float provided with a vertically disposed rod having suitable marks; a gage plate disposed opposite said rod; and means for maintaining a column of oil in said delivery pipe above the said float.

4. An oil distributing system comprising; a tank for storing oil: a delivery pipe extended above the said tank; a water column to raise the oil in said tank and delivery pipe; a gage to show the quantity of oil in the system having a cylinder in open communication with the said tank and extending between the normal high and low oil levels of the system, and a float in said cylinder supported by the oil therein, said float provided with a vertically disposed rod having suitable marks; a plurality of gage plates disposed opposite said rod; and means for maintaining a column of oil in said delivery pipe above the said float.

5. An oil distributing system comprising, a tank for storing oil: a delivery pipe extended above the said tank; a water column to raise the oil in said tank and delivery pipe; a float gage to show the quantity of oil in the system having a cylinder in open communication with the said tank and extending between the normal high and low oil levels of the system, and a device in said cylinder to operate by pressure to indicate the level of the oil in the system exclusive of the oil above said device; a tubular connection between said cylinder and the oil containing portion of the system, said tubular connection being arranged to check the flow from the said cylinder; and means for maintaining a column of oil in said delivery pipe above the said float of the gage.

6. An oil distributing system comprising; a tank for storing oil; a delivery pipe extended above the said tank; a water column to raise the oil in said tank and delivery pipe; a float gage to show the quantity of oil in the system having a cylinder in open communication with the said tank and extending between the normal high and low oil levels of the system, and a float in said cylinder to be supported by the oil therein, said float provided with a vertically disposed rod having suitable marks; a tubular connection between said cylinder and the oil containing portion of the system; said tubular connection being arranged to check the flow from the said cylinder; and means for maintaining a column of oil in said delivery pipe above the said float.

7. An oil distributing system comprising; a tank for storing oil having a delivery pipe extended above the said tank; a water column to raise the oil in said tank and delivery pipe; and a chamber located above said tank and extended from normal low oil level to high oil level and connected with said tank through a contracted opening.

8. An oil distributing system comprising; a tank for storing oil having a delivery pipe extended above the said tank; a chamber located above said tank and connected with said delivery pipe through a contracted opening; and a float located within said chamber and provided with a suitable device extended vertically above the float to indicate the movement of the said float.

9. In an oil distributing system, the combination of an oil tank, a delivery pipe, means for introducing a displacement liquid to deliver the oil through said pipe, an overflow pipe with which the displacement column is normally connected, and means automatically operating, upon the equilibration of the oil and displacement columns to fill the latter to the full height of the overflow.

10. In an oil delivery system, the combination with a storage tank, a delivery pipe, of a hydrostatic column of displacement fluid for normally supporting the oil within said tank and delivery pipe, means for subjecting the oil to a greater pressure than that of said hydrostatic column to effect a delivery of the oil, and means automatically operating upon the cessation of said greater pressure for reëstablishing said hydrostaic column at a predetermined fixed height.

11. In an apparatus for delivering liquids, the combination with a storage tank and delivery pipe, of means for introducing a displacement liquid to deliver oil from said tank, and means automatically operating after each delivery for establishing a hydrostatic displacement column of predetermined fixed height.

12. In an apparatus for delivering liquid by the displacement of another liquid of different specific gravity, a gage operating by the differential gravities of said liquids when subjected to the hydrostatic pressure of a column of the displacement liquid of fixed height, and means automatically operating after each delivery for reëstablishing a predetermined fixed height of said column of displacement fluid.

13. In a system for delivering liquid by the displacement of another liquid, a gage operating by the differential gravity of the two liquids, means for permitting an overflow of the displacement liquid after each delivery of oil, and means operating after the equilibration of the fluids to fill the displacement column to the full height of said overflow.

14. In a system for the storage and delivery of liquids by the hydrostaic pressure of a displacement fluid, means automatically operating after each delivery to establish a column of the displacement fluid of predetermined fixed height.

Signed at Algonac, in the county of St. Clair and State of Michigan, this ninth day of March, A. D. 1909.

LUTHER C. SNELL.

Witnesses:
   HENRY JACKSON,
   D. A. KENDALL.